T. GRIEVE.
GRATE.
APPLICATION FILED FEB. 10, 1910.
1,002,200.
Patented Aug. 29, 1911.
5 SHEETS—SHEET 3.
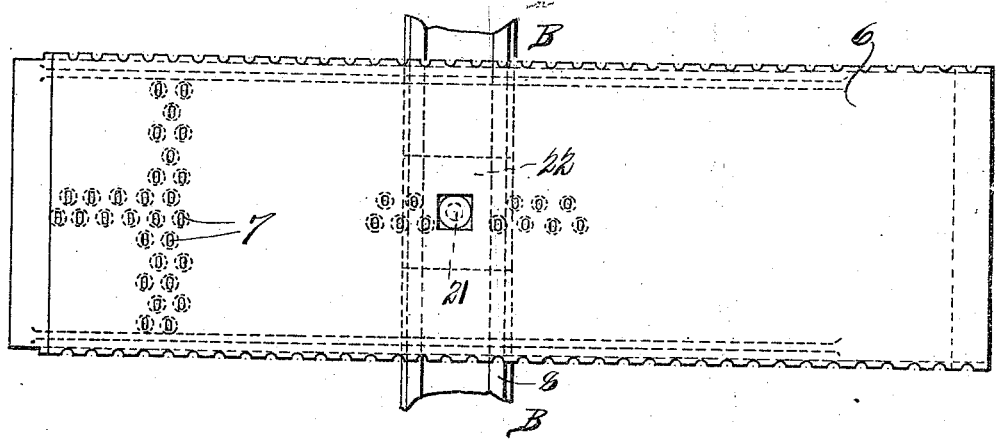
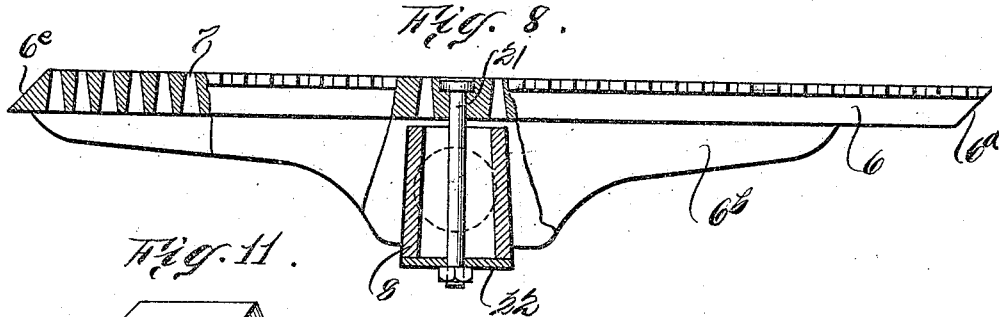
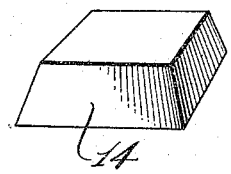
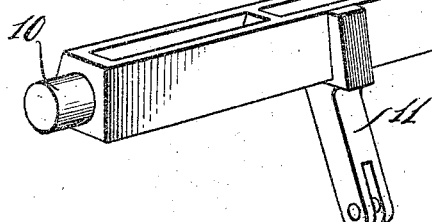
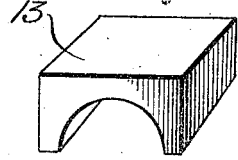
Witnesses:
C. A. Jarvis
C. T. Neal
Inventor:
Thomas Grieve
by Emerson R. Newell
Attorney

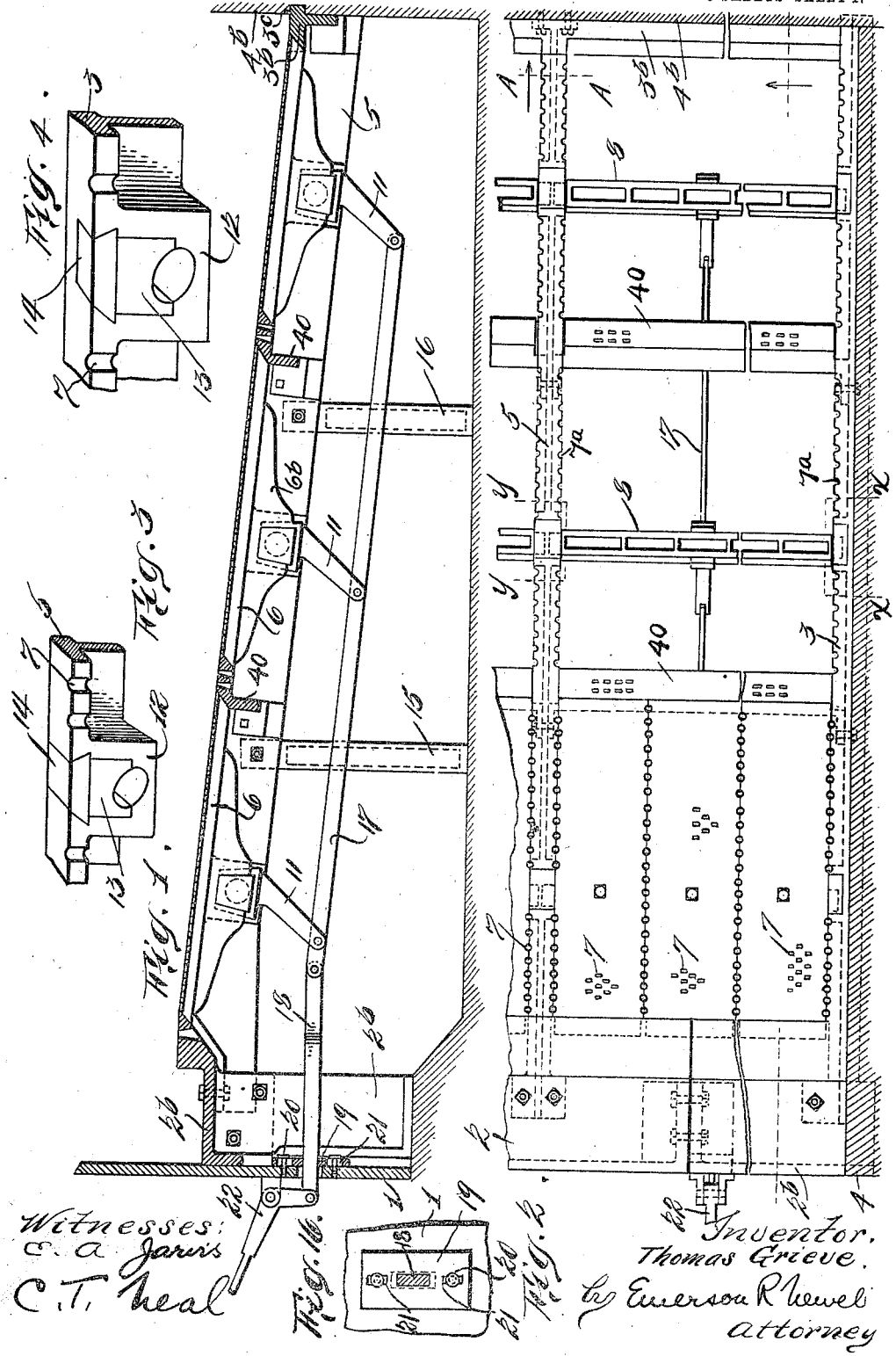

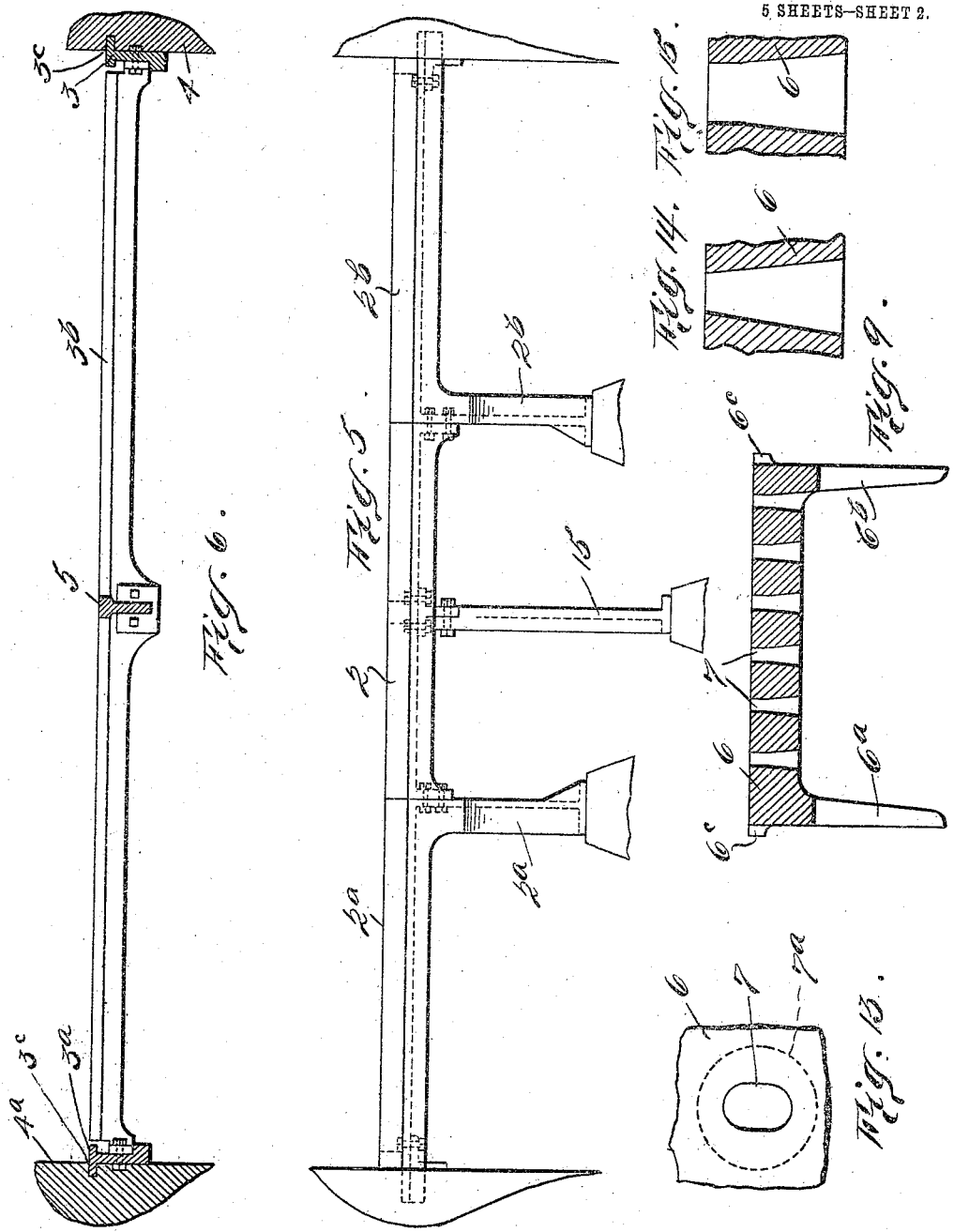

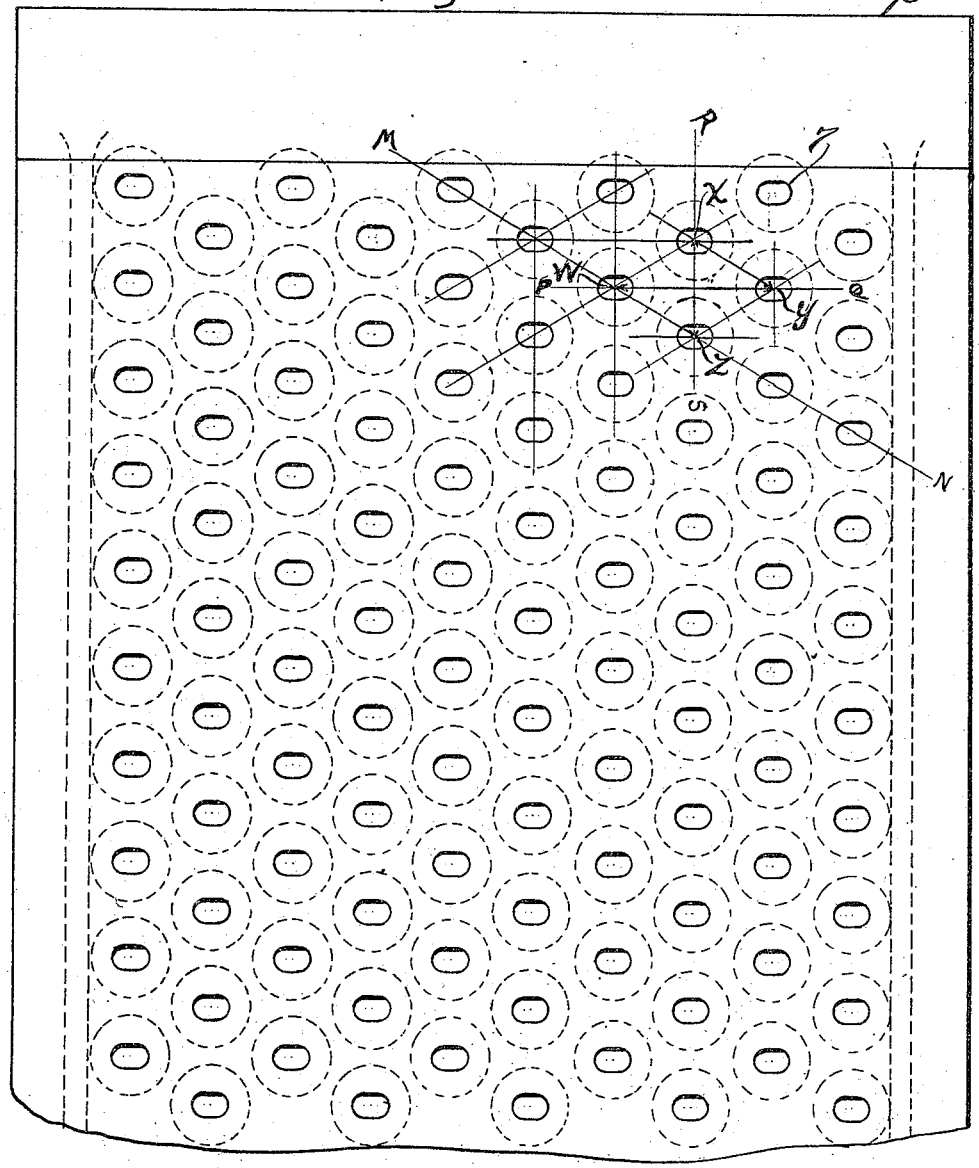

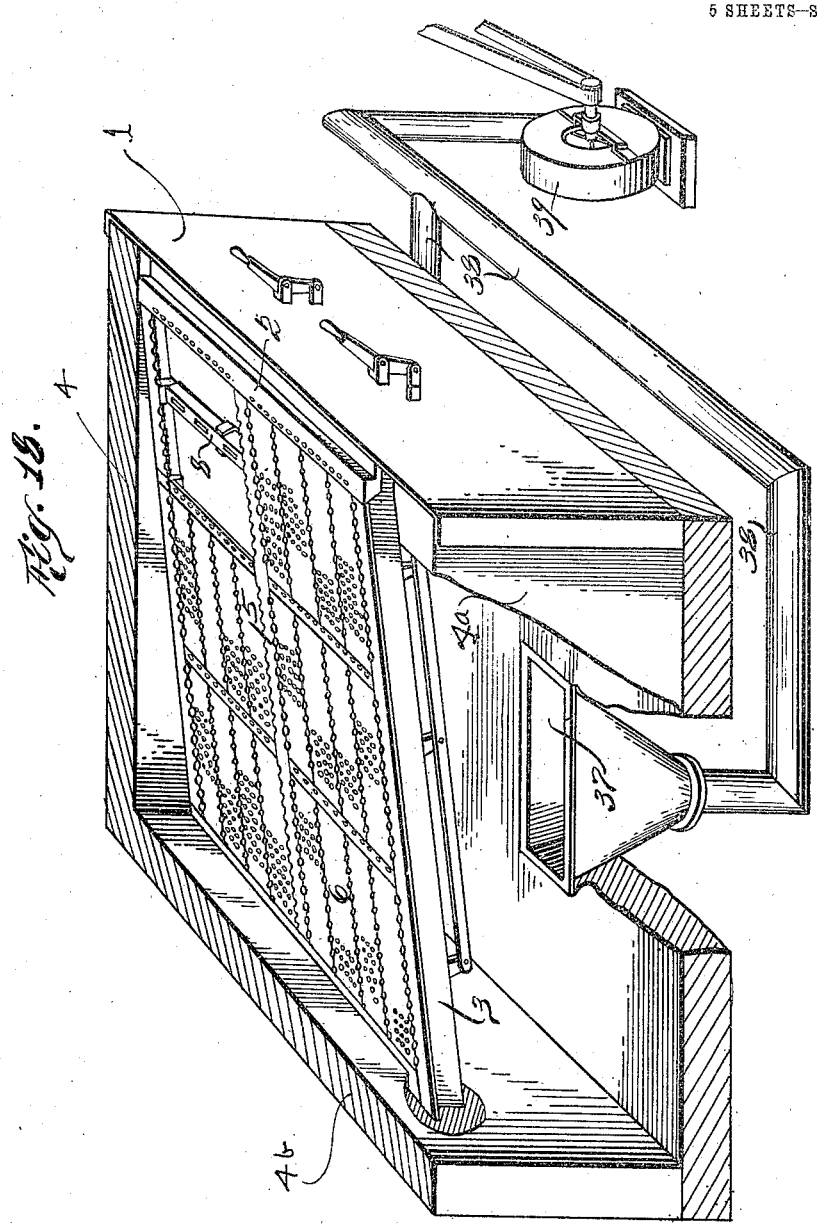

UNITED STATES PATENT OFFICE.

THOMAS GRIEVE, OF PERTH AMBOY, NEW JERSEY, ASSIGNOR TO THE GRIEVE GRATE COMPANY, OF NEW YORK, N. Y., A CORPORATION OF NEW YORK.

GRATE.

1,002,200.  Specification of Letters Patent.  Patented Aug. 29, 1911.

Application filed February 10, 1910. Serial No. 543,044.

*To all whom it may concern:*

Be it known that I, THOMAS GRIEVE, a citizen of the United States, residing at Perth Amboy, New Jersey, have invented certain new and useful Improvements in Grates, of which the following is a clear, full, and exact description.

My invention relates to an improved grate for furnaces and consists in certain novel features and combination of parts which result in a more complete and economical combustion of fuel. The preferred construction shown in the drawings is more particularly designed for the burning of small sizes of anthracite coal and other cheap grades of fuel, and for this purpose the orifices through said grate are arranged to obtain the most thorough and complete diffusion of air throughout said fuel bed, so as to produce a uniform area of effective combustion throughout the entire surface of said grate.

My object is to have a grate with a restricted area for admission of air to the fuel bed, combined with a strong forced draft, and to prevent the escape of air around the grate or fuel bed, so as to control as effectively as possible the supply and distribution of the air into the bed of fuel.

For best results the perforations through the grate should be evenly spaced from one another and arranged to supply air equally to the intervening dead space, and in burning fuel of poor combustible quality, such as anthracite screenings, dust, breeze (waste coke), etc., the perforated area should be small in comparison to the surface area of the grate, and sufficient air supplied to the fuel by an increased forced draft. The perforations of the grate preferably have a circular form at the lower side of the grate tapering upwardly into narrower elongated openings at the upper surface thereof. This distribution of comparatively large circular openings at the bottom of the grate provides an extensive gathering agency for the entering air, which is concentrated and driven through the smaller elongated outlets at the surface with an injector effect for assisting the action of the forced blast in spreading and diffusing said air throughout the fuel.

To obtain the full effectiveness of the draft beneath the fuel bed, the sides of the grate are preferably locked or sealed in the side walls of the furnace, whereby leakage of air around the outside of the fuel bed is prevented, and accurate control of the air passing through the fuel bed is obtained. The air beneath the grate particularly when a forced draft is employed, has a tendency to creep along the walls of the furnace between the outside edges of the grate, which not only has an objectionable effect on the fire, but this action soon causes the furnace walls to disintegrate, crumble away, and form even larger escaping passageways, until the arch or wall of the furnace must be rebuilt. Therefore it is the object of my invention to both prevent this crumbling away of the furnace walls and to provide a construction of grate which does not easily deteriorate or wear away under the great heat to which it is subjected, whereby the longevity of the entire furnace is greatly increased. Further advantages of this combination and novel features of construction will be hereinafter more fully described, and the scope of the invention particularly pointed out in the appended claims.

Referring to the accompanying drawings which show a preferred embodiment of my invention: Figure 1 is a longitudinal section of the entire grate; Fig. 2 is a partial plan of the same; Fig. 3 is a detail of the rocker bar bearing along Y—Y of Fig. 2; Fig. 4 is a similar detail along line X—X of Fig. 2; Fig. 5 is a front end view of the grate; Fig. 6 is a section across the furnace along A—A Fig. 2; Fig. 7 is a detached plan view of one grate section; Fig. 8 is an elevation of the same partly in section; Fig. 9 is a cross section of the same along B—B of Fig. 7; Fig. 10 is a perspective view of a rocker bar; Figs. 11 and 12 are perspective views of the bearing details; and Figs. 13, 14 and 15 are details showing the configuration of the grate perforations; Fig. 16 is a fragmentary view of the sliding cover for the dumping bar; Fig. 17 is an enlarged plan view of a portion of a grate section showing more accurately the relative size and arrangement of the elliptical perforations; and Fig. 18 is a perspective view of the entire grate showing the means for supplying a forced draft thereto.

Referring more particularly to the drawings, 1 indicates the front wall, 4, 4ᵃ the side walls and 4ᵇ the rear wall of the furnace. The entire grate comprises a frame of which a front supporting bar or dead plate 2 is mounted adjacent the front wall of the furnace. For the sake of convenience this dead plate is preferably constructed in three sections, 2, 2ª, 2ᵇ, as shown in Fig. 5, all riveted together. The parts 2ª, 2ᵇ are provided with supporting stanchions as shown.

3, 3ª indicate the side supporting bars, and 3ᵇ the rear supporting bar of the frame, all of which preferably have a laterally extending flange 3ᶜ as shown in Figs. 1 and 6, embedded in the masonry of the walls. A longitudinal central supporting bar 5 connects the front and rear end bars, and although in the construction shown only one of these longitudinal bars is provided, it is understood that the size of the furnace may be extended so as to have a plurality of said bars if desired. One or more supporting posts 15—16 may be provided as shown for this central bar 5. One or more transverse strengthening bars 40 connect the side bars and the central bar, and these may also form abutments for the adjacent ends of the grate sections, as will be hereinafter described.

Transversely mounted in bearings 12 between the longitudinal bars is a rocking bar 8 having trunnions 9 and 10 for turning in the bearings, see Fig. 10. Secured to each bar 8 is an operating arm 11 as shown and these arms may be secured to a common operating rod such as 17 for rocking all of the connected grate sections simultaneously. It is often desirable to remove this rocking bar from the grate, such as for repair or renewal, and for this purpose I have shown a preferable construction of bearing which will allow this removal in Figs. 3 and 4. The trunnion of the rocking bar rests in the bearing seat 12 and is held therein by plug or block 13, which is shown in detail in Fig. 12. A sliding key 14 shown in Fig. 11 with beveled edges is inserted above the block 13 to form a lock therefor. The bearings along the central longitudinal bar 5 are preferably as shown in Fig. 3, wherein the key 14 extends clear across the bar but the side bars are preferably provided with bearings such as shown in Fig. 4, where the key 14 can only be inserted at one end.

Detachably mounted upon each of the rocking bars are one or more grate sections such as shown in Figs. 7, 8 and 17. These grate sections have depending side ribs 6ª, 6ᵇ shown in Figs. 1, 8 and 9, and these ribs are cut away at their center to provide an upwardly tapering notch so that they may snugly embrace the rocker bar 8 as shown in Fig. 8. A bolt 21 and plate 22 may be used to detachably secure the grate section to the rocking bar. I preferably mount the grate sections upon this rocking bar away from their central line or in any other way, which will put them out of balance so that their normal tendency is to fall by gravity into horizontal position. Each end of the grate sections is preferably beveled in the same direction as indicated at 6ᵈ and 6ᵉ, and the transverse bars 20 are also beveled to correspond with the bevels of the grate sections, so that the grate sections when in horizontal position with their ends resting against the transverse bars, will fit the same closely and form a substantially air-tight closure. It will be observed in Fig. 1 that the adjacent portion of the dead plate 2ᵇ, as well as the rear end plate 3ᵇ, is also beveled to fit the ends of the grate sections. Along one or both longitudinal sides of the grate sections is preferably formed a lateral projecting flange 6ᶜ which serves as the abutting edge between the adjacent sections.

Each of the grate sections is perforated uniformly throughout its surface, and the dead plate 2, as well as the transverse bars 40, are perforated in the same manner, while the abutting side edges 6ᶜ of the grate sections and the side supporting bars 3, 3ª are provided with semi-circular matching recesses 7ª as shown to complete this uniform distribution of air holes. These perforations are preferably formed as shown in Figs. 13, 14 and 15, that is, tapering from the bottom toward the top and also having a circular shape at the bottom with a substantially elliptical or elongated shape at the top. This form of perforation has been found in practice to spread the air passing therethrough into a narrow fan-like sheet which more completely diffuses throughout the fuel bed than when the air comes up through a perfectly round hole.

As shown more clearly in Figs. 7–17 of the drawings, the perforations 7 are preferably arranged in accordance with a regular constructional design, the arrangement being such that the center of each perforation is equally distant from each adjacent perforation. The perforations are also disposed in parallel rows, the perforations of each row being staggered with those of adjacent rows and since the centers of all adjacent perforations are equidistant, the design of this arrangement is such that lines drawn through the centers of mutually adjacent perforations would form a series of adjacent equilateral triangles. This arrangement is important as providing a very compact arrangement of perforations to obtain uniform distribution of air-spaced area and at the same time preserving the structural strength of the grate bar. Since the webbing between the air perforations is of substantially the same width and thickness throughout, the liability of weak places subject to cracking is avoided. Referring more particularly to Fig. 17, the perforations may be considered as lying in several different rows; for instance, perforations X, Z along line R—S may be considered as in a horizontal row relative to the lengthwise direction of the grate section, perforations W, Y along line P—Q, as in a vertical row, and perforations W, Z along line M—N, as in a diagonal row. It is to be noted that the distance between adjacent perforations such as W, Y of the vertical rows is greater than that between the adjacent perforations of the other rows considered, and I prefer to arrange my elliptical openings with their major axes in the direction of these vertically considered rows, in other words, in line with that row which has the greatest distance between adjacent perforations. This arrangement I have found provides an even diffusion of the air throughout the fuel bed, and produces a uniform area of effective combustion throughout the surface of said grate. By a "uniform area of effective combustion" is meant that the fuel is equally well consumed over all parts of said grate having no partially burned black spots as is the case with the ordinary grate, which has no such even distribution of air supply.

In Fig. 18 is illustrated the preferred means for introducing the forced draft beneath the grate, in which 37 indicates an opening through the bottom of the furnace, said opening 37 communicating with a conduit 38 leading from an ordinary fan or blower 39 which supplies the draft.

I provide a fine distribution of comparatively small-sized openings at the surface of the grate, rather than a coarse distribution of large openings, since with a forced draft of air under high pressure coming through large openings the fuel bed is apt to be blown to pieces. For best results, therefore, my perforations are sufficiently restricted in size to prevent the fuel bed from being broken up and disposed closely enough together to supply all parts of the fuel evenly, the combined area of the perforations being less than one-sixth or 16⅔% of the total surface area of said grate usually from 6% to 8% of said area. Furthermore, my perforations as shown are arranged with their longer axes transversely of the lengthwise direction of said grate section, or, in other words, the direction of the elongation of said perforations is across the shorter side of said grate section. This arrangement adds materially to the structural strength of the grate section, and to a large extent prevents the cracking of the section along its length.

By reference to Figs. 1, 2 and 6, it will be observed that the sides and rear end of the grate are locked or sealed into the side and back walls of the furnace by the flanges 3ᶜ, being embedded into the masonry thereof. The air at the sides of the grate can therefore not find its way up along the side walls of the furnace outside the edges of the fuel bed and mingle with the products of combustion to cool the fire, but must pass up through the orifices formed by the matching semicircular recesses 7ᵃ at the abutting edges of the grate section and side bars 3, 3ᵃ and enter the bed of fuel. Since these bordering orifices are a part of the regular design of the perforated area and of equal size with the other perforations, there is no greater tendency for the air to pass through the bordering portions of the fuel bed than through any other portion. In other words, all of the air passing through the grate passes through the bed of fuel and is distributed uniformly throughout the same.

At the front of the furnace is the usual operating crank 22 for the dumping bar 17, which bar extends through the furnace front as shown. The slotted opening in the furnace front is sealed by a plate 19 which is slidably mounted at one side of the furnace front by means of studs 20 engaging end slots 21 in said plate. The plate has an opening which closely fits the bar 17 and therefore vertically reciprocates with the up and down movement of said bar, but has no longitudinal movement away from the furnace front. The opening is thus kept covered at all times. This arrangement is for the purpose of preventing the escape of air from beneath the grate when the forced draft is employed.

What I claim is:

1. A grate comprising a stationary supporting frame composed of side bars and end bars having flanges adapted to be embedded in the walls of the furnace, transverse and longitudinal supporting bars connecting said side and end bars respectively, several perforated grate sections pivotally mounted in said longitudinal bars, the abutting edges of said grate sections and side longitudinal bars being oppositely recessed to match and form orifices, the opposite ends of said sections adapted to rest against said adjacent transverse supporting bars and being beveled in the same direction, said transverse supporting bars also being beveled to fit the supporting ends of said sections.

2. A grate for furnaces comprising a supporting frame having side bars and end bars with flanges adapted to be inserted in the masonry of said furnace walls for forming a sealed joint, longitudinal and transverse supporting bars connecting said opposite end bars and opposite side bars respectively, several grate sections pivotally mounted on said longitudinal supporting bars to form a support for a fuel bed, said grate sections having their ends resting on said transverse supporting bars, the abutting edges of said supporting bars and grate sections being beveled to fit closely, each of said grate sections as well as said transverse supporting bars having similar perforations uniformly distributed throughout the same, and the adjacent edges of said grate sections as well as the edges of said longitudinal supporting bars being recessed to match and form openings, whereby a uniform quantity of air is admitted evenly to all parts of said fuel bed.

3. A perforated grate mounted within the walls of a furnace, its perforations being circular in shape at the lower side of said grate and elongated in shape at the upper surface thereof, in combination with means for forcing a draft of air therethrough, the sides of said grate being sealed to the walls of said furnace to prevent the passing of air between the lateral edges of said grate and said furnace walls.

4. A perforated grate mounted within the walls of a furnace, its perforations being circular in shape at the lower side of said grate and elongated in shape at the upper surface thereof, the center of each perforation being equidistant from the center of each adjacent perforation, in combination with means for forcing a draft of air therethrough, the sides of said grate being sealed to the walls of said furnace to prevent the passing of air between the lateral edges of said grate and said furnace walls.

5. A perforated grate mounted within the walls of the furnace, its perforations being circular in shape at the lower side of said grate and tapering upwardly to narrower elongated openings at the surface thereof, in combination with means for forcing a draft of air therethrough, said grate having flanges at its lateral edges embedded in the walls of said furnace to prevent the passing of air between the lateral edges of said grate and said furnace walls.

Signed at New York city, this 25th day of January, 1910.

THOMAS GRIEVE.

Witnesses:
BEATRICE MIRVIS,
NATHAN EPSTEIN.